United States Patent
Chiang

(10) Patent No.: US 7,370,385 B2
(45) Date of Patent: May 13, 2008

(54) FLEXIBLE WIPER WITH RUBBER COVER

(75) Inventor: Min-Heng Chiang, Taipei Hsien (TW)

(73) Assignee: Fu Gang Co., Ltd., Taipei Hsien (TW)

( * ) Notice: Subject to any disclaimer, the term of this patent is extended or adjusted under 35 U.S.C. 154(b) by 128 days.

(21) Appl. No.: 11/358,095

(22) Filed: Feb. 22, 2006

(65) Prior Publication Data

US 2008/0052865 A1    Mar. 6, 2008

(51) Int. Cl.
*B60S 1/38* (2006.01)
*B60S 1/40* (2006.01)

(52) U.S. Cl. ............................. 15/250.43; 15/250.201; 15/250.451

(58) Field of Classification Search ............. 15/250.43, 15/250.44, 250.201, 250.451, 250.452, 250.32
See application file for complete search history.

(56) References Cited

U.S. PATENT DOCUMENTS

| 2,663,043 | A | * | 12/1953 | Oishei | 15/250.39 |
| 3,427,637 | A | * | 2/1969 | Quinlan et al. | 15/250.451 |
| 2002/0053112 | A1 | * | 5/2002 | Ohyama | 15/250.43 |
| 2002/0133897 | A1 | * | 9/2002 | De Block et al. | 15/250.201 |
| 2004/0098821 | A1 | * | 5/2004 | Kraemer et al. | 15/250.201 |
| 2006/0026786 | A1 | * | 2/2006 | Ku | 15/250.32 |

FOREIGN PATENT DOCUMENTS

| JP | 2003-25383 | * | 2/2003 |
| WO | 99/36300 | * | 7/1999 |
| WO | 02/42129 | * | 5/2002 |

* cited by examiner

*Primary Examiner*—Gary K Graham
(74) *Attorney, Agent, or Firm*—Leong C. Lei

(57) ABSTRACT

A wiper is disclosed. The wiper comprises an elastic plate being elongated and having two ends with side edge provided with symmetrical notches; two securing seats provided with a substantially U-shaped slot and a grip section provided below the slot having a plurality of horizontal sectional slits; two rubber covers which are pointed and the bottom edge of the side edge of the cover being an inward hook section; and a bottom edge mounted with a buttoning rod seat with an engaging hook and a rubber stripe, whereby the elastic plate is mounted at the slot and is then engaged at the rubber cover, the grip is mounted with the rubber stripe and the center of the elastic plate and the two ends thereof are respectively securing to the buttoning rot seat and a protective cover, forming into the wiper.

4 Claims, 7 Drawing Sheets

FLEXIBLE WIPER WITH RUBBER COVER

BACKGROUND OF THE INVENTION

1. Technical Field of the Invention

The present invention relates to wiper, and in particular, to wiper which is easily mounted and provides excellent wiping on the surface of windscreen of a vehicle.

2. Description of the Prior Art

FIG. 1 shows a conventional wiper comprising a large frame 91, a middle frame 92 and a small frame 93. A fastening rod 911 is provided on the large frame 91 for mounting onto the wiper arm of a vehicle. The drawback of the conventional wiper is the numerous parts which are combined by riveting method. This is laborious and cost-ineffective and the entire manufacturing process is complicated and the yield is low. Accordingly, it is an object of the present invention to provide a wiper which mitigates the above-drawbacks.

SUMMARY OF THE INVENTION

The primary purpose of the present invention is to provide a wiper comprising an elastic plate being elongated and having two ends with side edge provided with symmetrical notches; two securing seats provided with a substantially U-shaped slot and a grip section provided below the slot having a plurality of horizontal sectional holes; two rubber covers which are pointed and the bottom edge of the side edge of the cover being an inward hook section; and a bottom edge mounted with a buttoning rod seat with an engaging hook and a rubber stripe, whereby the elastic plate is mounted at the slot and is then engaged at the rubber cover, the grip is mounted with the rubber stripe and the center of the elastic plate and the two ends thereof are respectively securing to the buttoning rod seat and a protective cover, forming into the wiper.

Yet another object of the present invention is to provide a wiper, wherein the horizontal sectional hole is extended to half the dept. of the slot allowing the securing seat has an appropriate flexibility.

Still a further object of the present invention is to provide a wiper, wherein the inner end of the securing seat has the grip section being extended to an appropriate length such that the two securing seats are secured by the buttoning rod seat.

Another object of the present invention is to provide a wiper, wherein the inner edge of the lateral side of the protective cover is provided with an engaging hook, and the front end of the hook is a block such that the engaging hook is hooked onto the notch at the elastic plate and the block urges the end section of the elastic plate.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
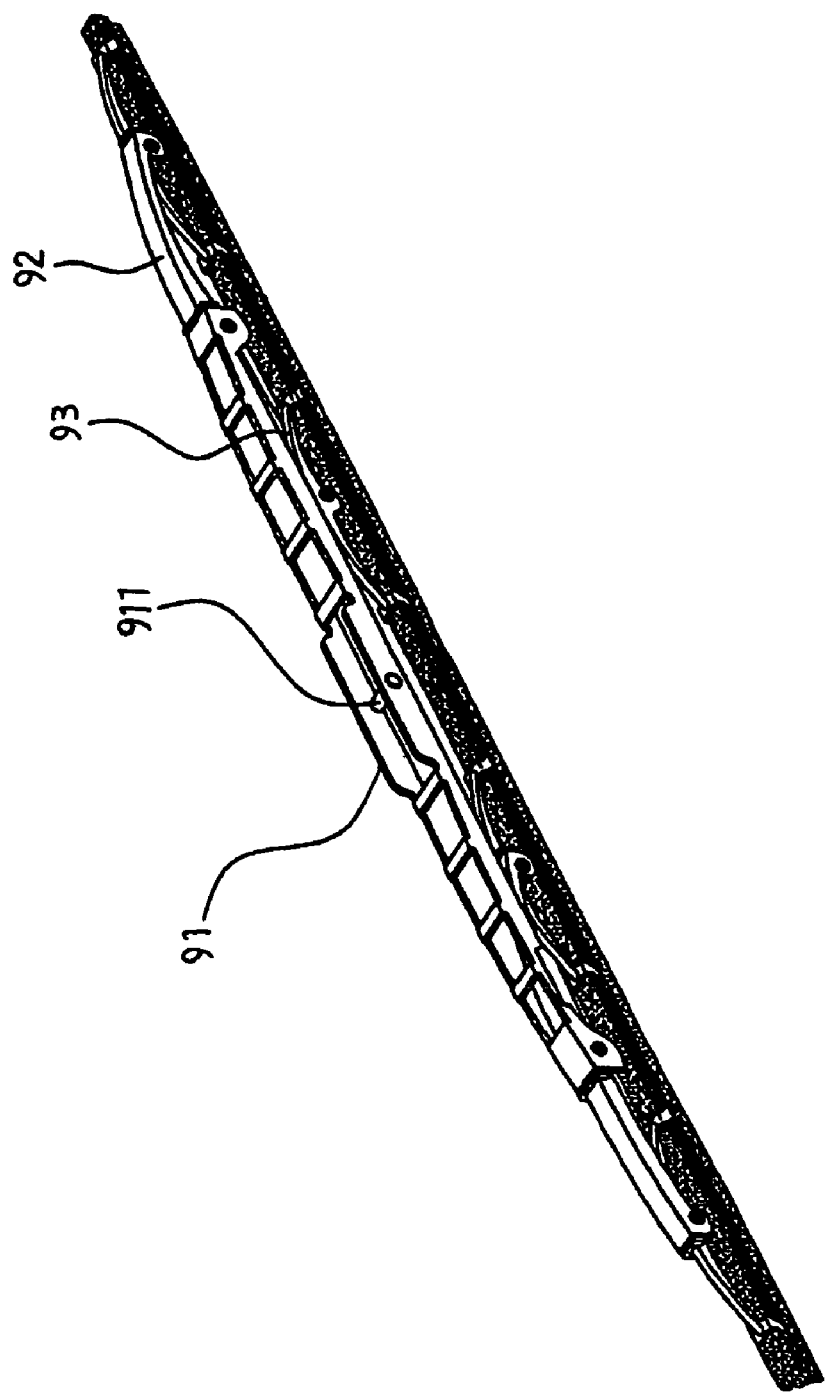
FIG. 1 is a perspective view of a conventional wiper.
Figure 2:
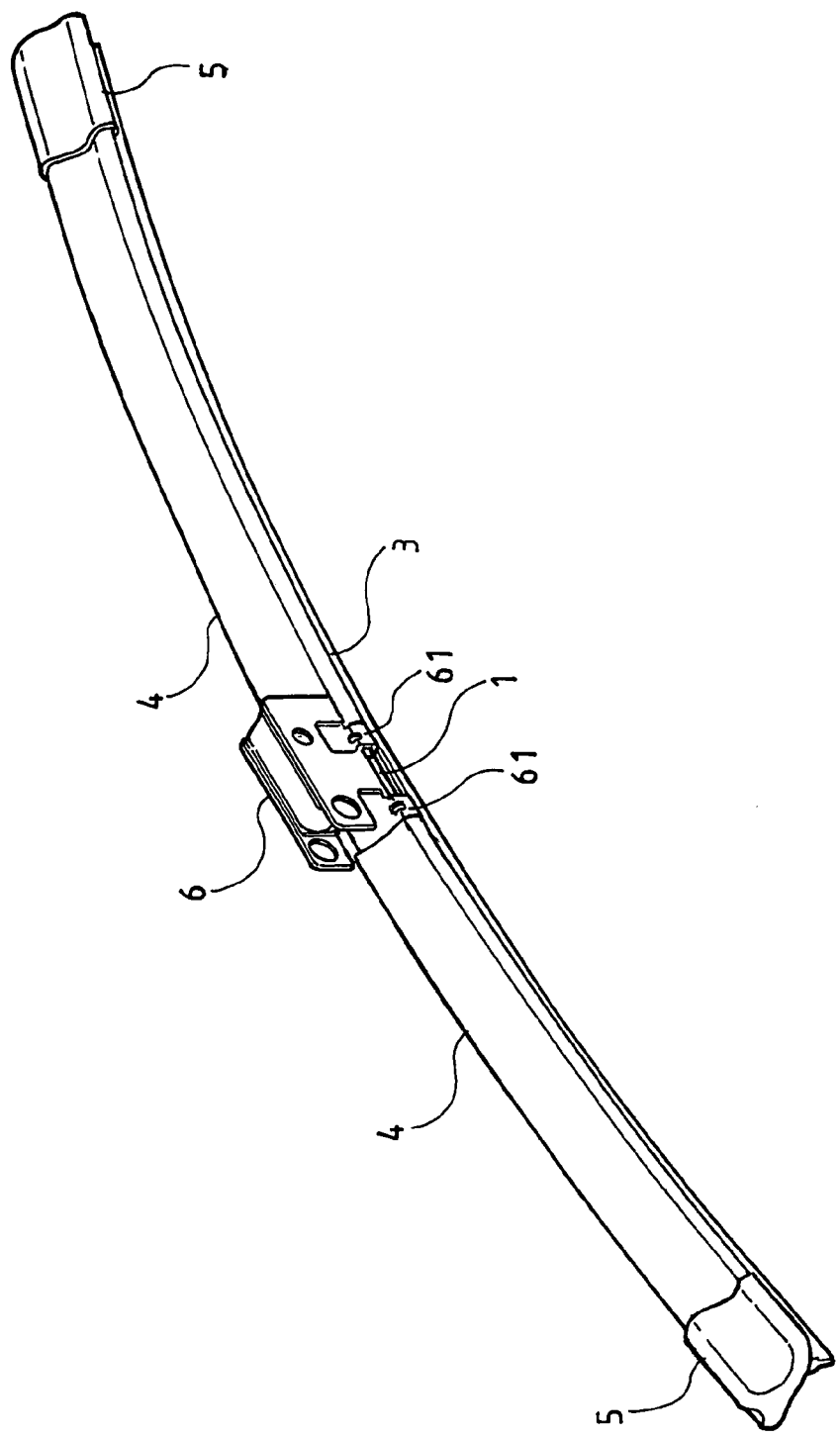
FIG. 2 is a perspective view of a wiper of the present invention.
Figure 3:
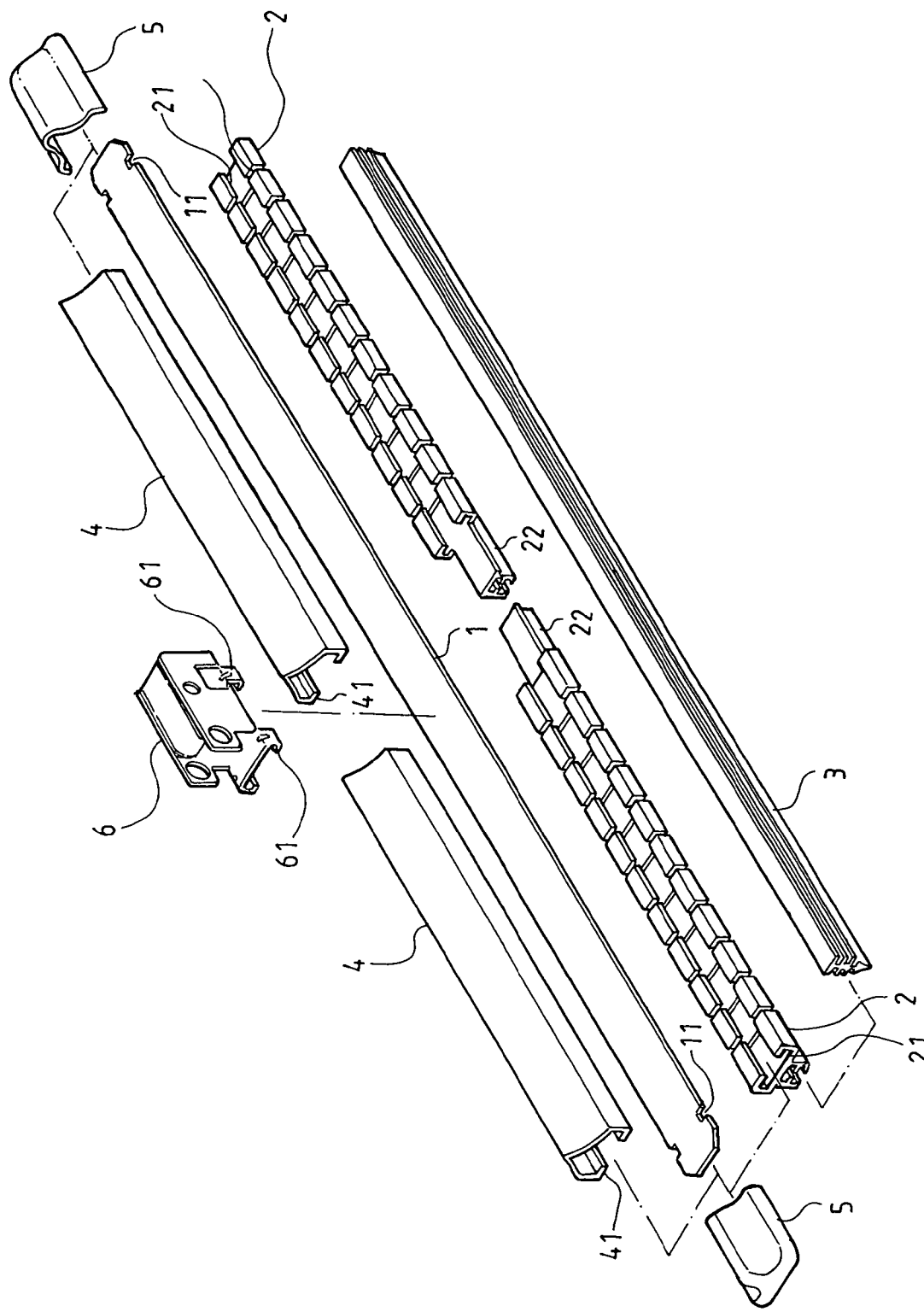
FIG. 3 is a perspective exploded view of the wiper of the present invention.
Figure 4:
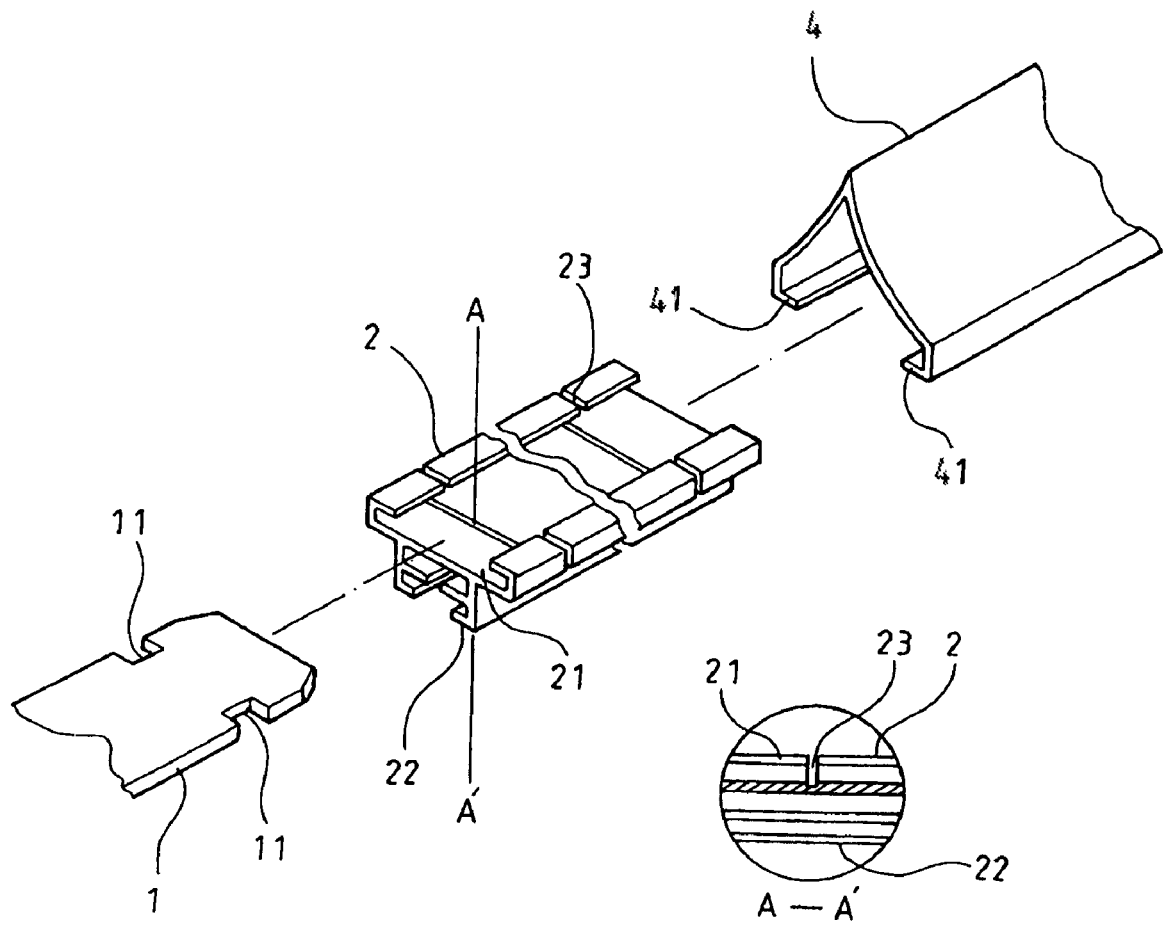
FIG. 4 is a perspective exploded view of the wiper of the present invention.

Referring to FIGS. 2, 3 and 4, there is shown a wiper comprising an elastic plate 1, two securing seats 2, a rubber strip 3, two rubber covers 4, two protective covers 5 and a fastening rod seat 6. The elastic plate 1 is elongated and the lateral side edge near to the ends of the elastic plate 1 is provided with symmetrical notches 11. The upper section of the securing seat 2 is provided with a U-shaped slot 21, and the lower section of the slot 21 is provided with a grip section 22. The slot 21 is provided with isolated rows of horizontal sectional slits 23 which extends to half the depth of a bottom wall defining the slot 21. The inward end of the securing seat 2 allows the extension of the grip section 22 to an appropriate length.

The rubber cover 4 is pointed and the bottom edge of the lateral side is provided with an inward hook section 41.

The bottom edge of the rod seat 6 is provided with symmetrical engaging hooks 61.

In combination, the elastic plate 1 is mounted in the slot 21 of the securing seat 2, and then, the securing seat 2 is engaged with the inner edge of the hook section 41 of the rubber cover 4. The grip section 22 is engaged with the rubber strip 3 and the two ends of the elastic plate 1 are mounted with a protective cover 5, and the engaging hook 61 of the rod seat 6 is secured to the center region of the elastic plate 1. The connecting section of the two securing seat 2 is the grip section 22 such that the rod seat 6 can easily secure the elastic plate 1. Thus, the wiper is obtained and the wiper arm held by the rod seat 6 will drive the wiper to move.

Figure 5:
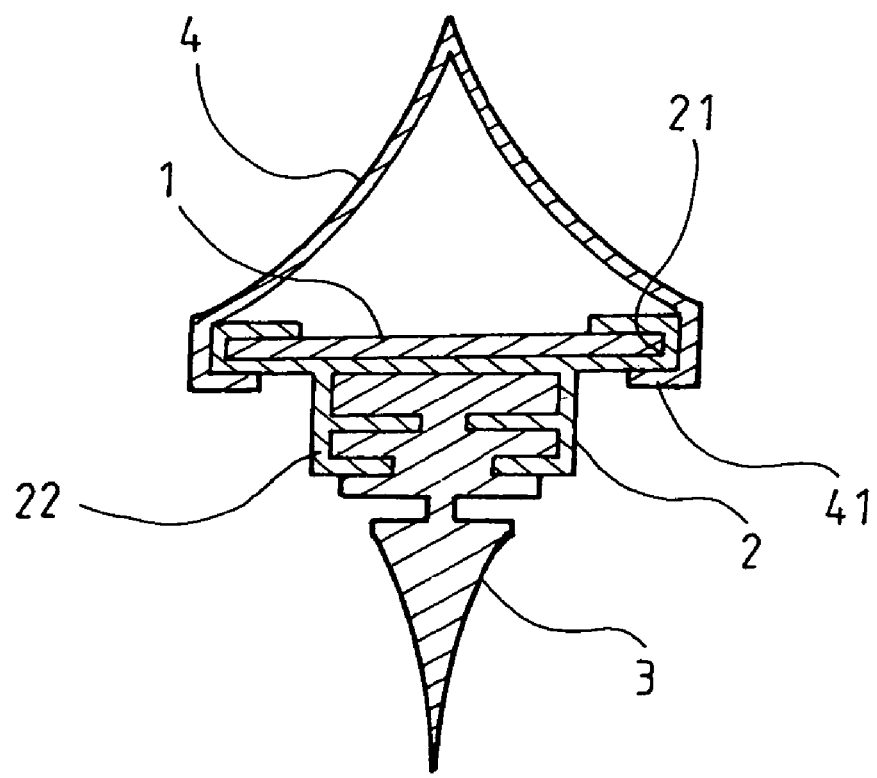
FIG. 5 is a sectional view of the wiper of the present invention.

As shown in FIG. 5, the elastic plate 1 is mounted in the slot 21, and after that it is placed onto the inner edge of the hook section 41. The grip section 22 is for the positioning of the rubber strip 3 such that the wiper can be easily and conveniently fixed.

Figure 6:
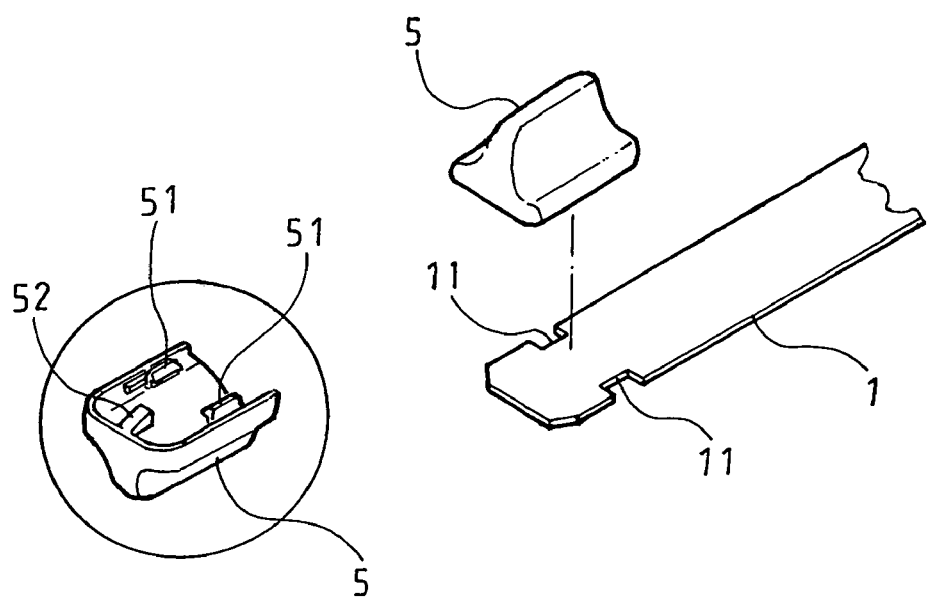
FIG. 6 is a perspective exploded view of the protective cover and the elastic plate of the present invention.
Figure 7:
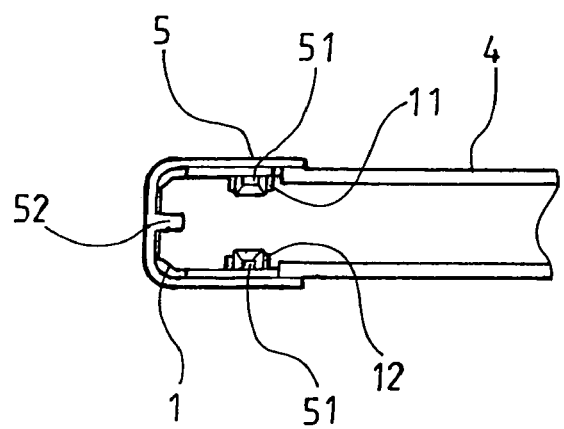
FIG. 7 is an implementation view of the protective cover and the elastic plate of the present invention.

As shown FIGS. 6 and 7, the inner edge of the protective cover 5 is provided with an engaging hook 51 and the inner edge at the front end is formed with a block 52 such that the protective cover 5 is fitted to the notches 11 of the elastic plate by means of the engaging hook 51 and the blocks 52 are used as a stop and the two protective covers 5 can be mounted at the two ends of the wiper.

Figure 8:
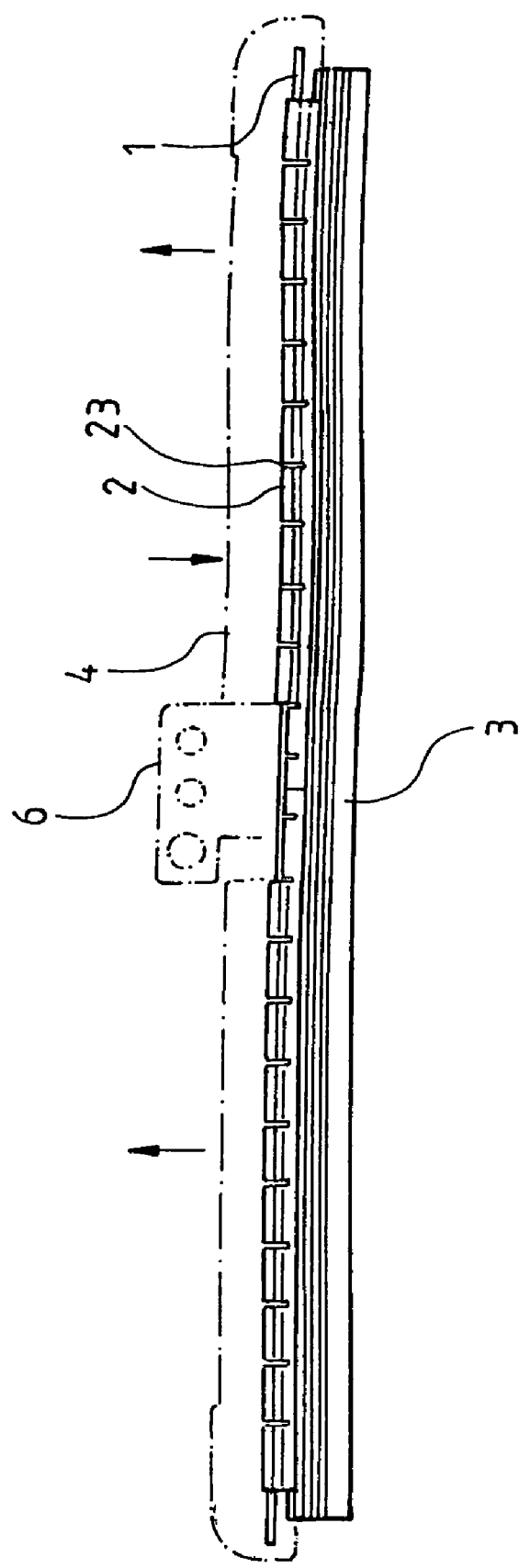
FIG. 8 is a schematic view showing the wiping of the wiper of the present invention.

Referring to FIG. 8, the securing seat 2 is provided with isolated rows of horizontal sectional slits 23 such that the wiper possesses flexibility. When the wiper is driven to move, the best flexibility will move along the contour of the surface in contact; the rubber strip 3 is close to the contact surface, and the wiping effect is enhanced.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A wiper comprising:
    an elastic plate being elongated and having two ends, each with side edges provided with symmetrical notches;
    two securing seats each provided with an upper section and a lower section, each said upper section being provided with a U-shaped slot therealong and having a plurality of transverse slits, each said lower section being provided with a grip section;
    two rubber covers which are pointed and a bottom edge of a side edge of the covers having an inward hook section; and
    the side edges of said elastic plate having mounted thereon a buttoning rod seat via hooks projecting therefrom;
    whereby the elastic plate is mounted in the slot of each of said securing seats and the upper sections are then engaged with the rubber covers, the grip sections are mounted with a rubber strip and a center of the elastic plate and the two ends thereof are respectively secured to the rod seat and a protective cover.

2. The wiper of claim 1, wherein the slits are extended to half the depth of a bottom wall of the slot.

3. The wiper of claim 1, wherein an inner end of the securing seats has the grip section being extended to a length such that the two securing seats are secured by the buttoning rod seat.

4. The wiper of claim 1, wherein an inner edge of a lateral side of the protective cover is provided with an engaging hook, and a front end of the engaging hook has a block such that the protective cover is hooked onto a respective one of the notches of the elastic plate and the block urges an end section of the elastic plate.

* * * * *